United States Patent
Orgias

(10) Patent No.: US 10,772,292 B2
(45) Date of Patent: Sep. 15, 2020

(54) INTERACTIVE AUTOMATIC PET FOOD BOWL

(71) Applicant: Peter Dwight Orgias, Brooklyn, NY (US)

(72) Inventor: Peter Dwight Orgias, Brooklyn, NY (US)

(*) Notice: Subject to any disclaimer, the term of this patent is extended or adjusted under 35 U.S.C. 154(b) by 425 days.

(21) Appl. No.: 14/998,337

(22) Filed: Jan. 4, 2016

(65) Prior Publication Data
US 2017/0188544 A1 Jul. 6, 2017

(51) Int. Cl.
*A01K 5/02* (2006.01)
*H04M 1/725* (2006.01)
*H04W 4/80* (2018.01)

(52) U.S. Cl.
CPC .......... *A01K 5/02* (2013.01); *H04M 1/72533* (2013.01); *H04W 4/80* (2018.02)

(58) Field of Classification Search
CPC .......... A01K 5/02; A01K 5/0291; A01K 5/01; A01K 5/0114; A01K 7/02; A01K 5/0128; A01K 39/01; A01K 39/014
See application file for complete search history.

(56) References Cited

U.S. PATENT DOCUMENTS

| | | | | |
|---|---|---|---|---|
| 3,180,316 A | * | 4/1965 | Chatfield | A01K 5/0291 119/51.12 |
| 7,124,707 B1 | * | 10/2006 | Clarke | A01K 5/0114 119/51.02 |
| 7,395,782 B1 | * | 7/2008 | Lindsay | A01K 5/0114 119/51.02 |
| 7,469,657 B2 | * | 12/2008 | Drummond | A01K 5/0114 119/62 |
| 7,874,265 B1 | * | 1/2011 | Addleman | A01K 5/025 119/59 |
| 7,895,973 B1 | * | 3/2011 | Whelan | A01K 5/025 119/51.02 |
| 8,161,911 B2 | * | 4/2012 | Jalbert | A01K 1/0107 119/501 |
| 8,166,922 B2 | * | 5/2012 | Jalbert | A01K 1/0107 119/501 |
| 2002/0134313 A1 | * | 9/2002 | King | A01K 5/025 119/51.02 |
| 2005/0145183 A1 | * | 7/2005 | Drummond | A01K 5/0114 119/62 |
| 2007/0125306 A1 | * | 6/2007 | Beecher | A01K 5/0142 119/51.02 |
| 2008/0257272 A1 | * | 10/2008 | Bolda | C02F 1/325 119/72 |
| 2010/0132629 A1 | * | 6/2010 | Jalbert | A01K 1/0107 119/720 |
| 2015/0040832 A1 | * | 2/2015 | Klein | A01K 5/0291 119/51.11 |
| 2017/0238503 A1 | * | 8/2017 | Deritis | A01K 5/0275 |

FOREIGN PATENT DOCUMENTS

GB 2451804 * 2/2009 ............... A01K 5/02

* cited by examiner

*Primary Examiner* — Kristen C Hayes
(74) *Attorney, Agent, or Firm* — MG Miller Intellectual Property Law LLC

(57) ABSTRACT

An automatic interactive pet food bowl includes a base; a bowl; a sensor that activates a retractable cover to protect contents of the automatic interactive pet food bowl; LEDs; a rotational energy connecting element a motor; a cover; a key pad; a solar paneling material; a small LED screen; a video screen; BLUETOOTH or WIFI; a camera; an outer housing; and a water level indicator sensor.

9 Claims, 9 Drawing Sheets

INTERACTIVE AUTOMATIC PET FOOD BOWL

BACKGROUND

Field of Invention

This invention relates to pet food bowls, specifically to such bowls which are used for pets to feed.

Description of Prior Art

Pet owners have commonly fed their pets by a pet food bowl. Such bowls have been used by suppliers to store food and water.

Originally pet food bowls just stored food for pets to eat leaving them open for insects and other pest drawn to it through the smell of the food. The standing water may cause mosquitos to spawn.

Thus if a pet food bowl is empty of water the user must be home or send someone to refill the bowl with water. On a hot day a pet may be out water and need to get their pet food bowls refilled. The current pet food bowls have no interactive abilities and cannot be accessed remotely through computer and cell phones.

OBJECTS AND ADVANTAGES

Accordingly, besides the objects and advantages of the cover described in my above patent, several objects and advantages of the present invention are:
  (a) to provide a cover which can be produced in a variety of colors;
  (b) to provide cover whose production allows for a convenient and extremely rapid and economical protection of contents;
  (c) to provide a cover which protects the contents from insects, etc.;
  (d) to provide an interaction by the user;

Further objects and advantages are to provide a pet food bowl which can be used easily and conveniently automatically to feed pets, which the user can interface with via computer, and cell phone, which gives the user the ability to open, close etc., via the computer and cell phone, which can allow for the user to look in on their pet, and see their pet via video screen, allowing for the user's pet to see the their owner. Still further objects and advantages will become apparent from a consideration of the ensuing description and drawings.

DRAWING FIGURES

Figure 8:
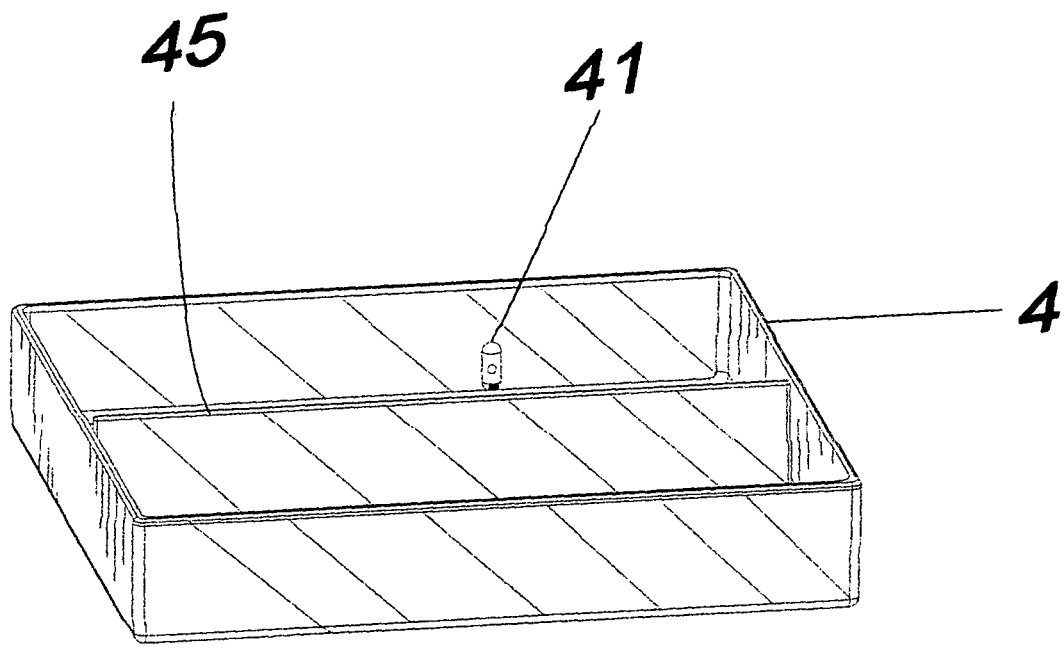

FIG. 8 is a front view of the automatic interactive pet food bowl 4 with the split 45 with the water sensor 41

Figure 9:
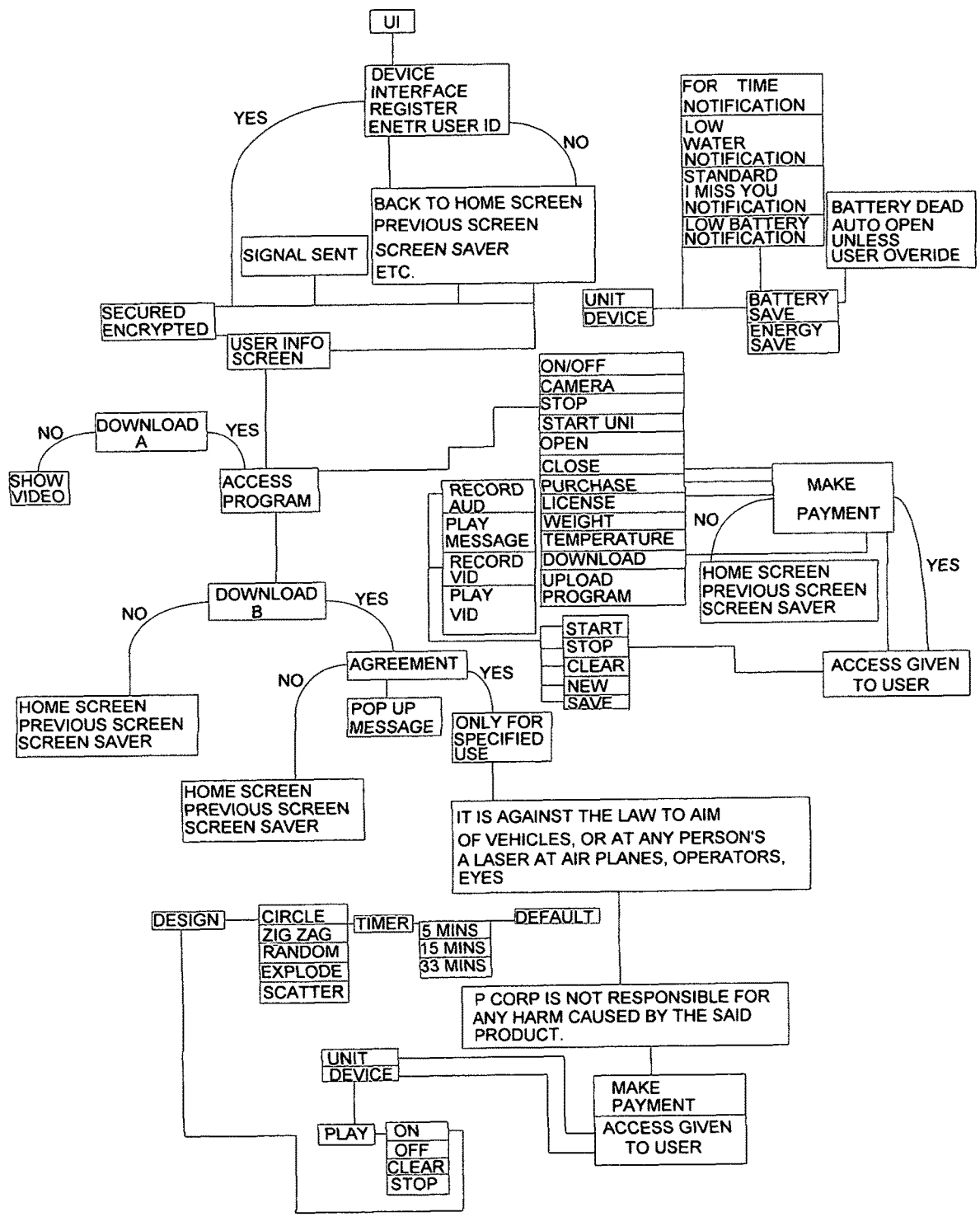

FIG. 9 is a flow chart.

REFERENCE NUMERALS IN DRAWINGS 2 base 14 speaker
4 removable bowl 15 solar material
sensor 18 small LED screen. 18 small led screen
LEDs 19 video screen. 19 video screen
rotational energy connecting element 20 BLUETOOTH WIFI. 20 Bluetooth WiFi
8 motor 21 camera
9 cover 14 microphone speaker
11 key pad 33 outter housing
35 water level sensor

DESCRIPTION—FIGS. 1 TO 9

A typical embodiment of the automatic interactive pet food bowl 4 of the present invention has a removable litter box 4 that once the motion sensor 5 is activated the belt 9 retracts revealing the pet food bowl 4 for your pets use, the belt 9 covering the pet food bowl 4 then after an approximate time period the cover 9 automatically retracts back covering over the pet food bowl 4. The cover 9 in The combination has a rotational energy connecting element 7 which has the flexible cover 9 may be winded around the rotational energy connecting element 7 in combination with a horizontal plurality of elongated support members of substantially approximate lengths and is operated by motor 8 which spins the rotational energy connecting element 7 whereby retracting opening and closing the cover 9. The outer housing 33 has a slit 30, 31 for the cover 9 that works in combination having a sensor 5 motor 8 with the rotational energy connecting element 7 for providing an intermittent continuous variable speed/power drive for coupling rotational energy from said motor and motors mechanism to the horizontal plurality of elongated support members of substantially approximate lengths of said unit. The automatic interactive pet food bowl in combination having a small LED screen 18 to show the approximate status of the said unit, whereby a camera 21 to allow whereby the user can remotely look in on, through computer and their cell phone. The automatic interactive pet food bowl in combination having a camera 21 to allow the user to remotely look in on their pet, through computer and their cell phone whereby a small laser projected show can be projected unto any adjacent wall whereby a users' pet can play for an approximate time period. The automatic interactive pet food bowl in combination having a LED screen 18 whereby the user can remotely look in on, leave a sound and visual video message which will play via the automatic interactive pet food bowl from the users' computer and their cell phone. The automatic interactive pet food bowl in combination having a BLUETOOTH WIFI 20 whereby the user can interface with the automatic interactive pet food bowl via the users' computer and their cell phone to remotely command and operate the said unit. The automatic interactive pet food bowl in combination having a solar material 15 whereby the user can save power operating the automatic interactive pet food bowl when then said unit is charging and charged via the sun.

The said unit base pan 4 in combination with water level sensor 35 whereby the said unit will notify the user via through the said unit audible and visual and via computer, cell phone etc., that they need to change their pet's water.

The sensor 35 is built in and fits into the bowl 4 inner base bottom when the bowl 4 is filled with water the tube 36 also fills with water and the ball 37 rises. When the water gets low the water in the tube 36 drains out through ullege and the ball 37 drops down to the bottom of the tube 36 and a connection is made and the signal is sent. The tube 36 has small slots 38 that allow water to fill up and float the ball 37. The sensor may be built into the bowl itself and is a short small prolate 36 with an enclosed orb 37. An encapsulated pellucid verticle container 36, an encapsulated pellucid verticle nacelle 36 and may be 4 vitreous in appearance. The encapsulated verticle nacelle 36 may nutate up and down and will make contact with the electrical leads and the proper electrical signal may be sent.

SUMMARY, RAMIFICATIONS, AND SCOPE

Accordingly, the reader will see that the cover of the automatic interactive pet food bowl of this invention can be used easily and conveniently, can prevent tampering, contamination, insects, when a pet is not eating out of its bowl. In addition, when the user may want they may interface the automatic interactive pet food bowl via their computer, cell phone app etc. Furthermore, the cover help pet owners keep an eye on their pets, feed their pets at designated times, the cover 9 may be one piece or separate sections;
the gear system (not shown) wherein may allow for by means of rather than retraction, suction rather than retraction;
the cover 9 may retract by means of different;
the cover 9 may be stratified;
the cover 9 may rotate epicyclic whereas revealing the opening;
the cover 9 may rotate horizontal whereas revealing the opening;
the cover 9 may rotate nutate whereas revealing the opening;
the cover 9 may trochoid;
the cover 9 may be on a tram;
the cover may be trefoil;
the cover may be corrugated;
the cover may be corrugated and wrap around a horizontal arbor;
horizontal arbor may flute;
the cover 9 may have a frustrum that has a lip that;
the cover 9 may have a screed;
the cover 9 may be homologous;
the slit may have a flexible doctor blade on the underside of the cornice;
The slit may have a flexible apron 124 on the underside of the cornice 112. A first end portion of the retractable cover 9 overlaps a second end portion of the retractable cover 9 so as to form an overlapped portion 136 above an opening of the removable pet food bowl 4.
when the cover in retracted open it may rest in a dog;
the cover 9 may be rigid and preforated;
the cover 9 may be elastic;
the cover may be a flexible conveyor;
the cover 9 may be a rigid preforated converyor;
the cover 9 may be sinusoidal;
the cover 9 may be rigid and soft flexible, may be link, nano wall etc.
the cover 9 may close with a sulcus;
the cover 9 may close with a fossa;
the cover 9 may be staggered;
the flexible doctor blade may be setaceous;
the cover 9 may fay;
the slot may be embrasure;
the cover 9 may be slanted;
the cover 9 may have a ribband;
the cover 9 may imbricate;
the cover 9 may be sliding;
a cover 9 may have a gland;
the unit may use springs to create tension;
the cover 9 may open verticle rather that horizontal;
the cover 9 may slide open in one piece or two separate sections;
the cover 9 may slide open in one piece or multiple separate sections;
the cover 9 may be translucent;
the cover 9 with its adjacent elements in a different manner whereas the cover 9 may open and close by means of;
the cover 9 may be rigid and soft flexible, may be link, nano wall etc.;
the size of the automatic interactive pet food bowl cover may be larger or smaller;
the color of the automatic interactive pet food bowl cover may vary;
the shape of the automatic interactive pet food bowl cover may vary;
the material of the of the automatic interactive pet food bowl cover may vary.

The unit may be interactive without cover 9 wherein the user can interface with said unit by means of camera 21 via computer and cell phone app.

The camera may project a laser show on an adjacent wall for pets to play for an approximate time.

The unit may be interactive without cover 9 wherein the user can interface with said unit by means of video screen 19 via computer and cell phone app.

The unit may be interactive without cover 9 wherein the user can interface with said unit by means of key pad 11 via computer and cell phone app.

The unit may be interactive without cover 9 wherein the user can interface with said unit by means of BLUETOOTH WIFI 20 via computer and cell phone app.

The unit may be interactive without cover 9 wherein the user can interface with said unit by means of thermometer 33 via computer and cell phone app.

The unit may be interactive without cover 9 wherein the user can interface with said unit by means of weight scale via computer and cell phone app.

whereby a small laser projected show can be projected unto any adjacent wall whereby a users' pet can play with the laser show for an approximate time period.

Although the description above contains many specificities, these should not be construed as limiting the scope of the invention but as to merely providing illustrations. For example, the cover can have other shapes, such as circular, oval, trapezoidal, triangular, etc.; the slit can be replaced by a hinge which connects two otherwise unconnected halves of the cover etc.

Thus the scope of the invention should be determined by the appended claims and their legal equivalents, rather than by the examples given.

Figure 1:
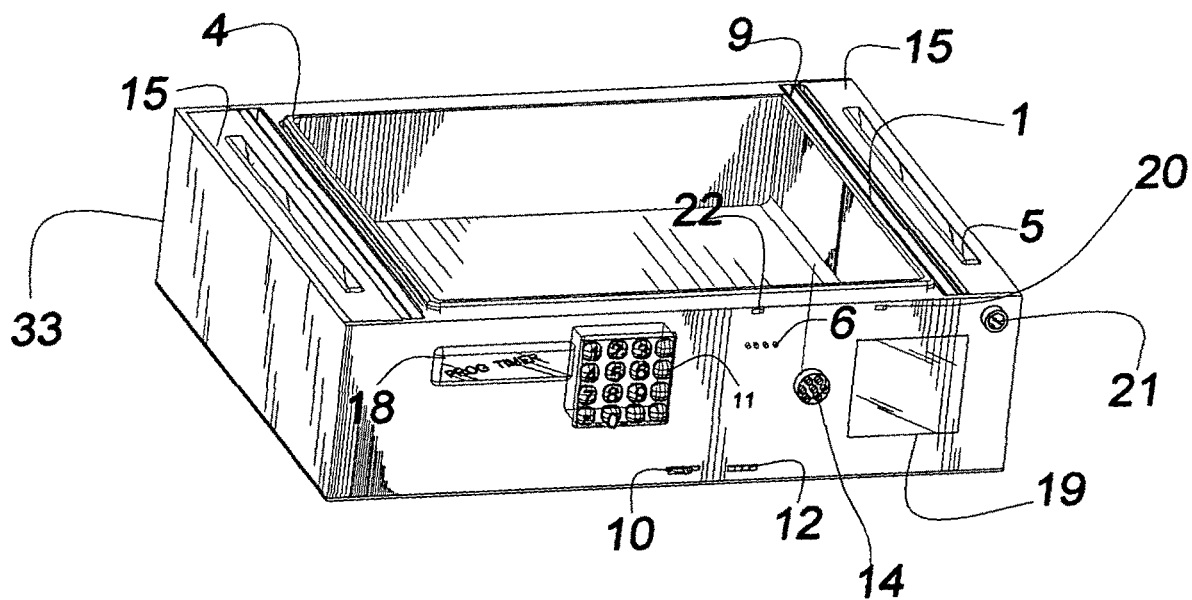
FIG. 1 is a front view perspective of the automatic interactive pet food bowl 4 according to the present invention.
Figure 2:
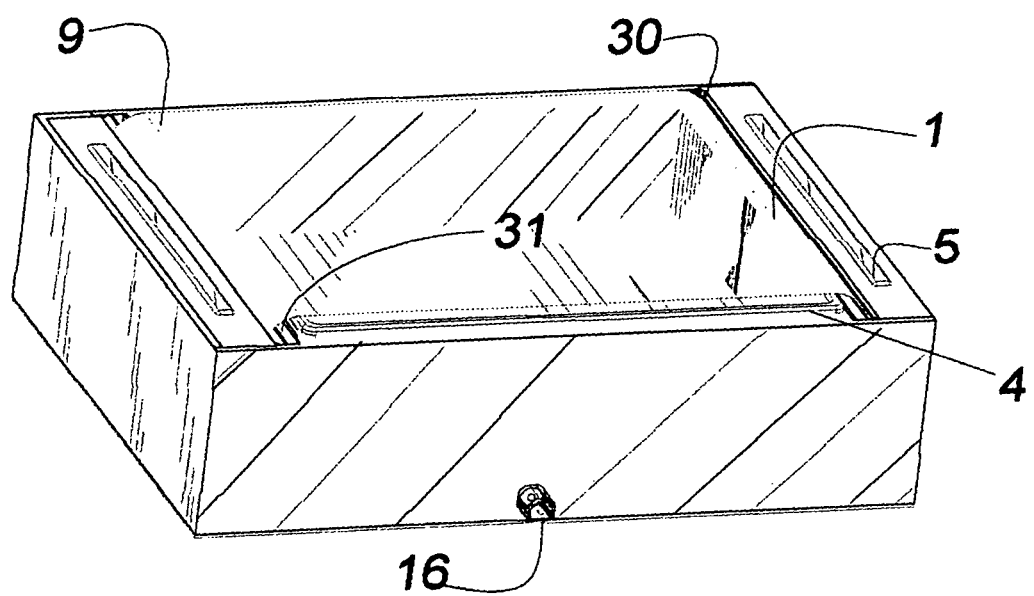
FIG. 2 is a cross-sectional view of the automatic interactive pet food bowl 4 of FIG. 1.

FIG. 1 is an automatic interactive pet food bowl comprising base 2 bowl 4 sensor that activates a retractable cover to protect the contents of the automatic interactive pet food bowl 5 leds 6 rotational energy connecting element 7 motor 8 cover 9 key pad 11 solar paneling material 15 small led screen 18 video screen 19 bluetooth wi-fi 20 camera 21 cutter housing 33 water level indicator sensor 35, hereby referred to as "unit".

Figure 3:
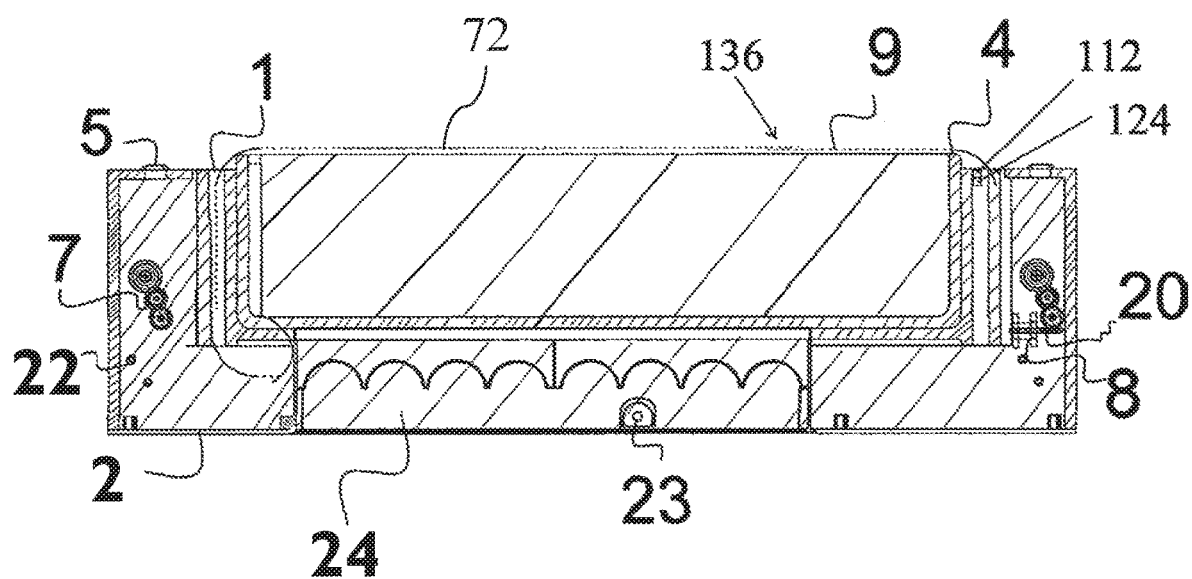
FIG. 3 is a rear view of the automatic interactive pet food bowl 4 of FIG. 1.
Figure 4:
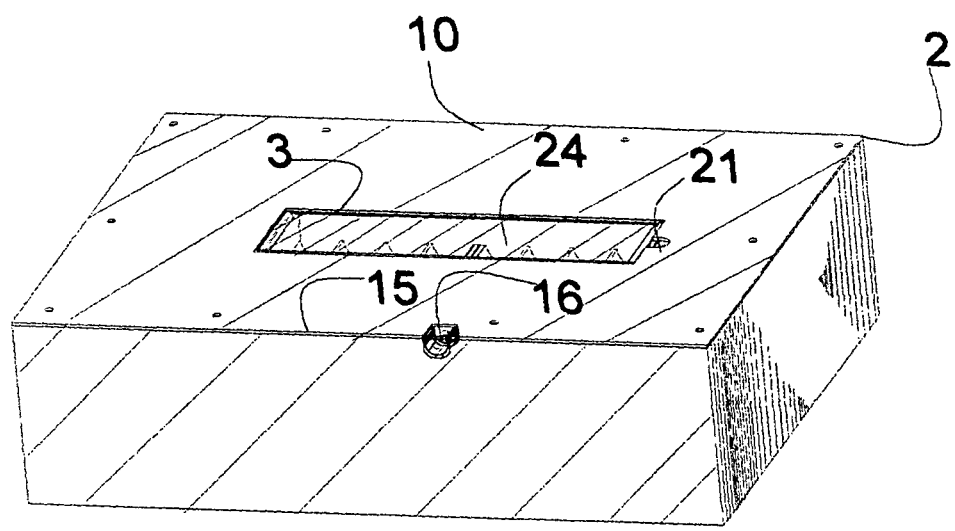
FIG. 4 is a front view of automatic interactive pet food bowl 4 of FIG. 1.
Figure 5:
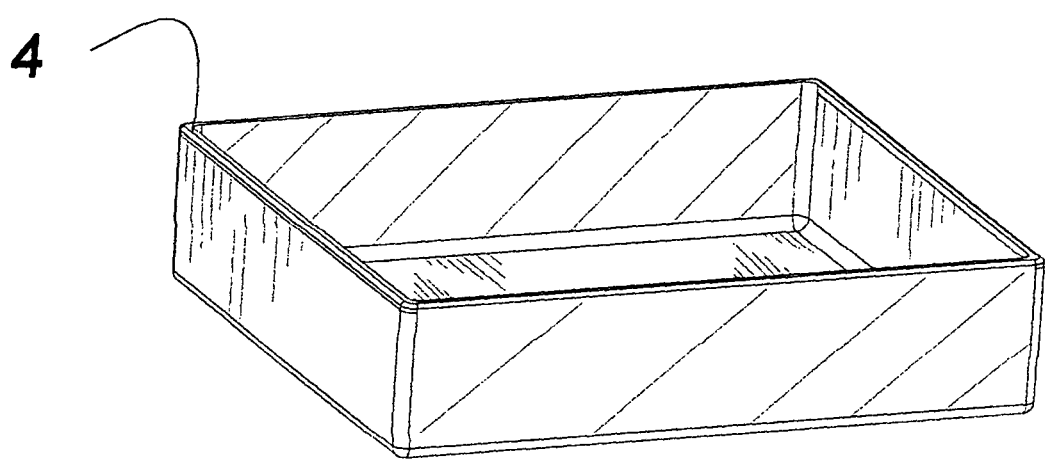
FIG. 5 is an exploded view of the automatic interactive pet food bowl with removable base pan 4.
Figure 6:
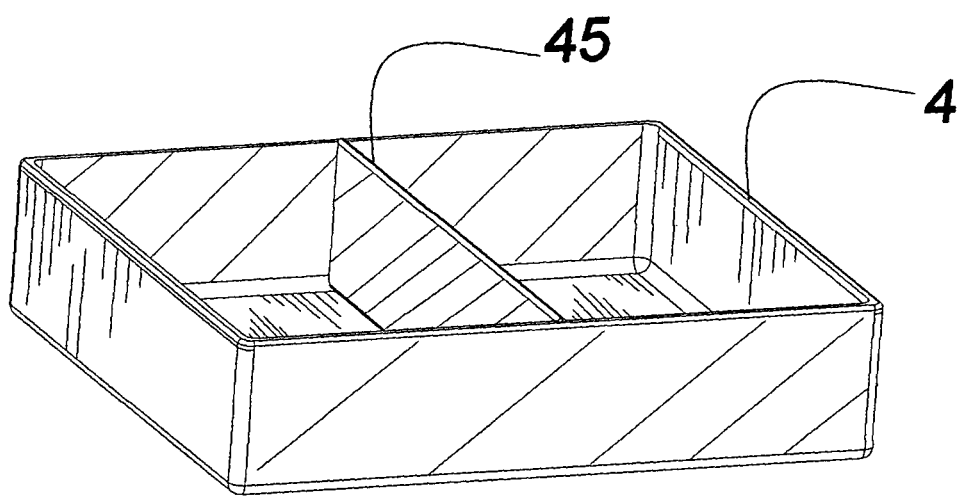
FIG. 6 is a front view of the pet food bowl removable bowl 4 removable bowl 4.
Figure 7:
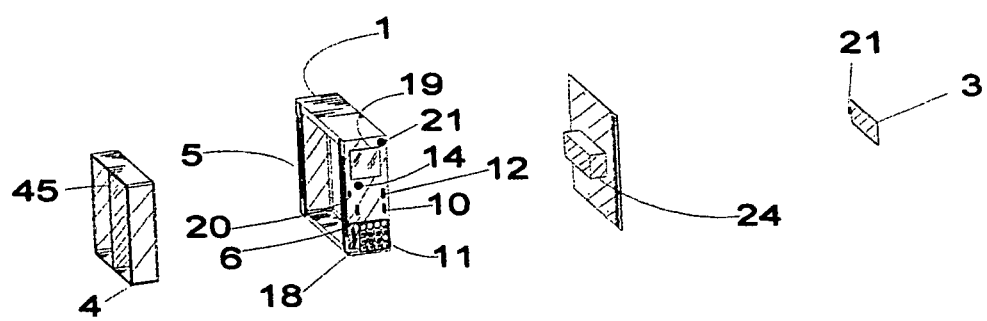
FIG. 7 is a front view of the automatic interactive pet food bowl 4 with the removable bowl 4.

Throughout this specification, the cover 9 can also be referred to as a retractable supple lid. Referring to FIG. 3, the present disclosure also contemplates embodiments of the automatic interactive pet food bowl that can include, a retractable supple screen 72. The retractable supple screen 72 can overlap with the retractable supple lid to create an overlapping portion 136.

I claim:

1. An automatic interactive pet food bowl system comprising an outer housing comprising a base; a retractable supple lid; and a first rift, and a small horizontal opening spaced on top wall of the outer housing; a removable pet food bowl configured to be placed in the outer housing; a sensor attached to the outer housing; a rotational energy connecting element; a motor driving the rotational connecting element and the retractable supple lid; wherein a first fissure and a bottomless depression are parallel to an edge of a top surface of the top wall of the outer housing; and wherein the automatic interactive pet food bowl system is characterized by a first condition in which a first portion of the retractable supple lid retracts from a position above the small horizontal opening through a beveled groove, over spool through a slender horizontal opening flowing over a beveled edge into and then to a position below a horizontal adjacent rod on spool and the removable pet food bowl is exposed; and a second condition in which the retractable supple lid covers the removable pet food bowl.

2. The automatic interactive pet food bowl system of claim 1, wherein the automatic interactive pet food bowl system is characterized by the second condition in which the first portion of the retractable supple lid overlaps an end portion of a retractable supple screen so as to form an overlapped portion above an opening of the removable pet food bowl.

3. The automatic interactive pet food bowl system of claim 1, wherein the automatic interactive pet food bowl system is characterized by the second condition in which a plurality of top surfaces of a plurality of side walls of the removable pet food bowl are higher than a plurality of top surfaces of a plurality of side walls of the outer housing and the plurality of top surfaces of the plurality of side walls of the removable pet food bowl are lower than the overlapped portion.

4. The automatic interactive pet food bowl system of claim 1, further comprising a supple apron on an underside of a cornice of a first small horizontal opening through the beveled groove.

5. The automatic interactive pet food bowl system of claim 1, wherein the retractable supple lid is see through.

6. The automatic interactive pet food bowl system of claim 1, further comprising LEDs attached to the outer housing; a key pad attached to the outer housing; a solar paneling material attached to the outer housing; a LED screen attached to the outer housing; a video screen attached to the outer housing; BLUETOOTH WI-FI equipment attached to the outer housing; and a camera attached to the outer housing.

7. The automatic interactive pet food bowl system of claim 1, further comprising a split dividing the removable pet food bowl into a first space and a second space.

8. The automatic interactive pet food bowl system of claim 7 further comprising a water sensor attached to a wall of the first space.

9. The automatic interactive pet food bowl system of claim 1, wherein the automatic interactive pet food bowl system is characterized by the first condition in which the retractable supple lid is wound around a spool and spun by the rotational energy connecting element.

* * * * *